(12) United States Patent
Stern et al.

(10) Patent No.: US 7,997,742 B2
(45) Date of Patent: Aug. 16, 2011

(54) CAPACITIVE COMB FEEDBACK FOR HIGH SPEED SCAN MIRROR

(75) Inventors: Miklos Stern, Woodmere, NY (US); Dmitriy Yavid, Stony Brook, NY (US)

(73) Assignee: Microvision, Inc., Redmond, WA (US)

(*) Notice: Subject to any disclaimer, the term of this patent is extended or adjusted under 35 U.S.C. 154(b) by 607 days.

(21) Appl. No.: 12/054,619

(22) Filed: Mar. 25, 2008

(65) Prior Publication Data

US 2009/0245299 A1  Oct. 1, 2009

(51) Int. Cl.
*G03B 21/00* (2006.01)
(52) U.S. Cl. ........... 353/122; 353/30; 353/31; 353/98; 353/99; 359/200.6; 359/200.7; 359/225.1; 359/291; 359/223.1; 310/309
(58) Field of Classification Search .......... 353/30, 353/31, 98, 99, 119, 122; 359/200.7, 225.1, 359/291, 223, 224, 225, 226, 200.6, 223.1, 359/224.1, 226.1, 237; 310/309; 235/454, 235/462.36; 324/662, 97, 658, 196
See application file for complete search history.

(56) References Cited

U.S. PATENT DOCUMENTS

| | | | |
|---|---|---|---|
| 5,844,222 A | 12/1998 | Ackley | |
| 6,142,379 A | 11/2000 | Bard et al. | |
| 6,636,339 B2 | 10/2003 | Lee | |
| 6,637,657 B2 | 10/2003 | Barkan et al. | |
| 6,655,597 B1 | 12/2003 | Swartz et al. | |
| 6,769,616 B2 * | 8/2004 | Fu et al. | 235/454 |
| 6,802,451 B2 | 10/2004 | Yavid et al. | |
| 6,832,724 B2 | 12/2004 | Yavid et al. | |
| 6,899,271 B2 | 5/2005 | Willins et al. | |
| 6,910,633 B2 | 6/2005 | Swartz et al. | |
| 6,924,476 B2 | 8/2005 | Wine et al. | |
| 6,935,566 B1 | 8/2005 | Mulla et al. | |
| 6,995,495 B2 * | 2/2006 | Ko et al. | 310/309 |
| 7,006,274 B1 | 2/2006 | Wittenberg et al. | |
| 7,030,353 B2 | 4/2006 | Stern et al. | |
| 7,042,613 B2 | 5/2006 | Barnea et al. | |
| 7,059,523 B1 | 6/2006 | Yavid | |
| 7,071,594 B1 * | 7/2006 | Yan et al. | 310/309 |
| 7,077,325 B2 | 7/2006 | Tan et al. | |
| 7,088,494 B2 * | 8/2006 | Mizuno | 359/291 |
| 7,124,952 B2 | 10/2006 | Tan et al. | |
| 7,130,095 B1 | 10/2006 | Wood | |
| 7,131,728 B2 | 11/2006 | Nambudiri et al. | |
| 7,163,294 B2 | 1/2007 | Nambudiri et al. | |
| 7,182,262 B2 | 2/2007 | Wood et al. | |

(Continued)

OTHER PUBLICATIONS

Laser Production Display (LPD), Symbol Technologies, Inc., Part No. DS-LPD, Jun. 2006.

(Continued)

*Primary Examiner* — Georgia Y Epps
*Assistant Examiner* — Sultan Chowdhury
(74) *Attorney, Agent, or Firm* — Kevin D. Wills

(57) ABSTRACT

An image projection system (100) has a laser (102, 104, 106) providing at least one beam (103, 105, 107) to a scan mirror apparatus (130) for scanning the at least one beam (103, 105, 107) in two orthogonal directions (404, 406). The scan mirror (130) includes an oscillating portion (204, 904) disposed contiguous to a frame (202) and includes a reflective portion (218, 918) capable of reflecting the beam (103, 105, 107). Circuitry (500) is provided for measuring the capacitance between interdigitated teeth (212, 214, 912, 914) on the frame (202) and the oscillating portion (204, 904).

17 Claims, 3 Drawing Sheets

U.S. PATENT DOCUMENTS

| | | | |
|---|---|---|---|
| 7,182,263 B2 | 2/2007 | Li et al. | |
| 7,199,933 B2 | 4/2007 | Yavid et al. | |
| 7,227,294 B2 | 6/2007 | Mazz et al. | |
| 7,273,281 B2 | 9/2007 | Stern et al. | |
| 7,274,718 B2 | 9/2007 | Tan et al. | |
| 7,287,862 B2 | 10/2007 | Yavid | |
| 7,296,750 B2 | 11/2007 | Wood et al. | |
| 7,296,897 B2 * | 11/2007 | Mooradian et al. | 353/31 |
| 7,302,174 B2 | 11/2007 | Tan et al. | |
| 7,303,290 B2 | 12/2007 | Wittenberg et al. | |
| 7,304,795 B2 | 12/2007 | Yavid et al. | |
| 7,307,650 B2 | 12/2007 | Wittenberg et al. | |
| 7,312,911 B2 | 12/2007 | Tan et al. | |
| 7,391,222 B2 * | 6/2008 | Nishio | 324/662 |
| 7,815,119 B2 * | 10/2010 | Partyka | 235/462.36 |
| 2002/0149294 A1 * | 10/2002 | Matsumoto et al. | 310/309 |
| 2004/0223126 A1 * | 11/2004 | Hatakeyama et al. | 353/122 |
| 2005/0020926 A1 | 1/2005 | Wiklof et al. | |
| 2005/0184351 A1 | 8/2005 | Fu | |
| 2007/0121087 A1 * | 5/2007 | Garg | 353/119 |
| 2007/0268458 A1 * | 11/2007 | Lee et al. | 353/31 |
| 2007/0278311 A1 | 12/2007 | Partyka | |
| 2008/0158524 A1 * | 7/2008 | Konno et al. | 353/99 |
| 2010/0067078 A1 * | 3/2010 | Obi et al. | 359/200.6 |

OTHER PUBLICATIONS

Symbol Laser Projection Display (LPD): A Minature, High Resolution Projection Engine, Symbol Technologies, Inc., Part No. WP-LPD, Jun. 2006.

Saang Woong Lee, "PCT International Search Report and Written Opinion," WIPO, ISA/KR, Korean Intellectual Property Office, Daejeon, Republic of Korea, Jun. 29, 2009, 11 pages.

* cited by examiner

CAPACITIVE COMB FEEDBACK FOR HIGH SPEED SCAN MIRROR

FIELD

The present invention generally relates to laser beam image projection devices, and more particularly to an apparatus for providing feedback describing the position of a scan mirror.

BACKGROUND

It is known that two-dimensional images may be projected onto a screen by reflecting a laser beam or beams off of an oscillating scan mirror to project a raster pattern including scan lines alternating in direction, for example, horizontally across the screen, with each scan line being progressively displaced vertically on the screen. The laser beam or beams are selectively energized to illuminate pixels on the screen, thereby providing the image.

A first scan mirror typically oscillates at a high speed back and forth horizontally while a second scan mirror oscillates at a lower speed vertically. The first scan mirror oscillates at a resonance frequency with the highest velocity in the center while approaching zero as it nears either extreme of its oscillation. The second mirror moves at a constant speed in the orthogonal direction (vertically) from the top of the screen to the bottom, for example, then returns to the top for the next generation of the image.

The repetitive oscillation or movement of the mirrors is caused by a drive apparatus for each mirror. Conventional mirror systems include a permanent magnet or a piezoelectric device mounted on each mirror with a drive signal applied to a coil or directly to the piezoelectric device, thereby providing motion to the mirror. A processor providing the drive signal determines the timing at which the lasers must be pulsed to match the speed at which the mirrors are driven, in a synchronous fashion, to illuminate the appropriate pixel.

In order for the processor to make an accurate determination of the position of the mirror or mirrors for coordinating the laser beam pulses to improve image convergence between the alternating scans, feedback of the mirror's position is provided to the processor so the laser pulse may be appropriately timed. One known method of providing this feedback is to mount a magnet on the mirror, which creates a changing magnetic field as the mirror is scanning. The changing electric current generated in an external coil provides the feedback indicating the velocity of the scan mirror. The position can in turn be deduced from this signal. However, mounting a magnet on the mirror increases the inertia, and in turn, the size of the entire mirror structure.

Accordingly, it is desirable to provide an apparatus for providing feedback of the mirrors position to improve image convergence without increasing the mass of the mirror. Furthermore, other desirable features and characteristics of the present invention will become apparent from the subsequent detailed description and the appended claims, taken in conjunction with the accompanying drawings and this background.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An image projection system includes a pulsed light source, for example, red, green, and blue lasers, and a mirror system including an oscillating reflective surface for generating an image comprised of scanned lines. In order to synchronize the pulsed light and the positioning of the mirror, capacitive feedback is obtained that indicates the position of the mirror. The mirror includes a moveable frame (on the order of a few microns) and an oscillating reflective surface disposed contiguous thereto. The moveable frame and oscillating reflective surface have a plurality of first and second teeth, respectively, interdigitized and spaced apart. A circuit determines the capacitance between the first and second teeth as the reflective surface oscillates that correlates to a position of the reflective surface. This capacitance, or position, is then synced with the pulsed light source by a processor to provide an improved convergence of the scanned lines of the image.

Figure 1:
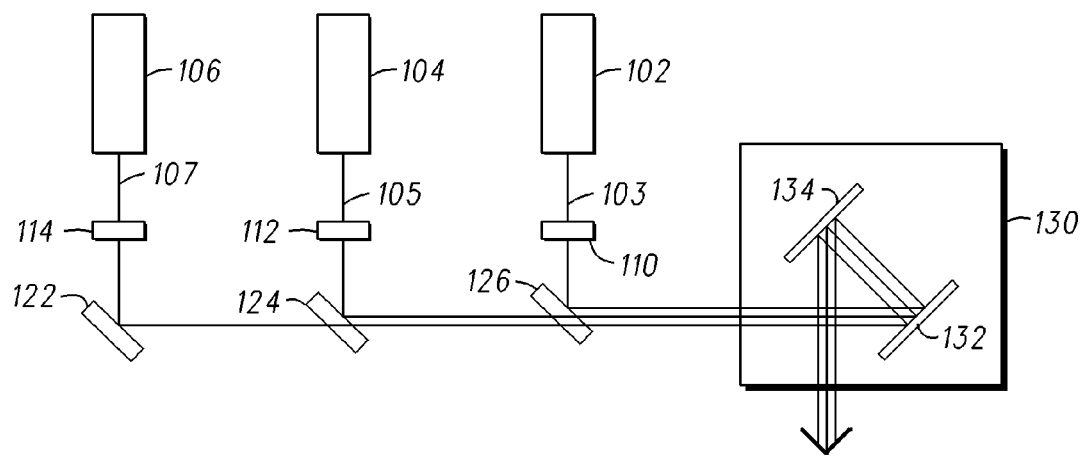
FIG. 1 is a top view of a known image projection system.

Referring to FIG. 1, a projection system 100 includes three lasers 102, 104, 106 for emitting a beam of different frequencies. Laser 102 preferably is a semiconductor laser emitting a red beam 103 at about 635-655 nanometers. Lens 110 is a biaspheric convex lens having a positive focal length and is operative for collecting virtually all the energy in the read beam 103 and for producing a diffraction-limited beam with a focus at a specified distance from the lens.

The laser 104 preferably is a semiconductor laser emitting a blue beam 105 at about 475-505 nanometers. Another biaspheric convex lens 112 shapes the blue beam 105 in a manner analogous to lenses 110 shaping the red beam 103.

Laser 106 is preferably a laser system including an infrared semiconductor laser having an output beam of 1060 nanometers, and a non-linear frequency doubling crystal. An output mirror (not shown) of the laser 106 is reflective to the 1060 nanometer infrared radiation, and transmissive to the doubled 530 nanometer green laser beam 107. One or more lenses, for example a biaspheric convex lens 114, may be used to create the desired beam 107 shape. While lasers 102 and 104 are described as semiconductor lasers and laser 106 is described as a laser system, it should be understood that any type of laser may be used for any of the three beams 103, 105, 107.

The laser beams 103, 105, 107 are pulsed at frequencies on the order of 100 MHz. The green beam 107 may require an acousto-optical modulator (not shown) within the laser system 106 to achieve that frequency, if a non-modulated solid-state laser system is used. The green beam 107 is reflected off of mirror 122 towards the scanning assembly 130. Dichroic filters 124 and 126 are positioned to make the green, blue, and red beams 103, 105, 107 as co-linear as possible (substantially co-linear) before reaching the scanning assembly 130. Most importantly, the dichroic mirrors direct all three beams towards the small high-speed scan mirror. Filter 124 allows the green beam 107 to pass therethrough, while reflecting the blue beam 105. Filter 126 allows the green beam 107 and blue beam 105 to pass therethrough, while reflecting the red beam 103. The operation of the system described above is described in detail in U.S. Pat. No. 7,059,523 which is incorporated herein by reference.

The nearly co-linear beams 103, 105, 107 are reflected off a first scan mirror 132 and a second scan mirror 134. One or more additional mirrors (not shown), which may be stationary, may be utilized to direct the beams 103, 105, 107 in the desired direction and/or for image orientation.

Figure 2:
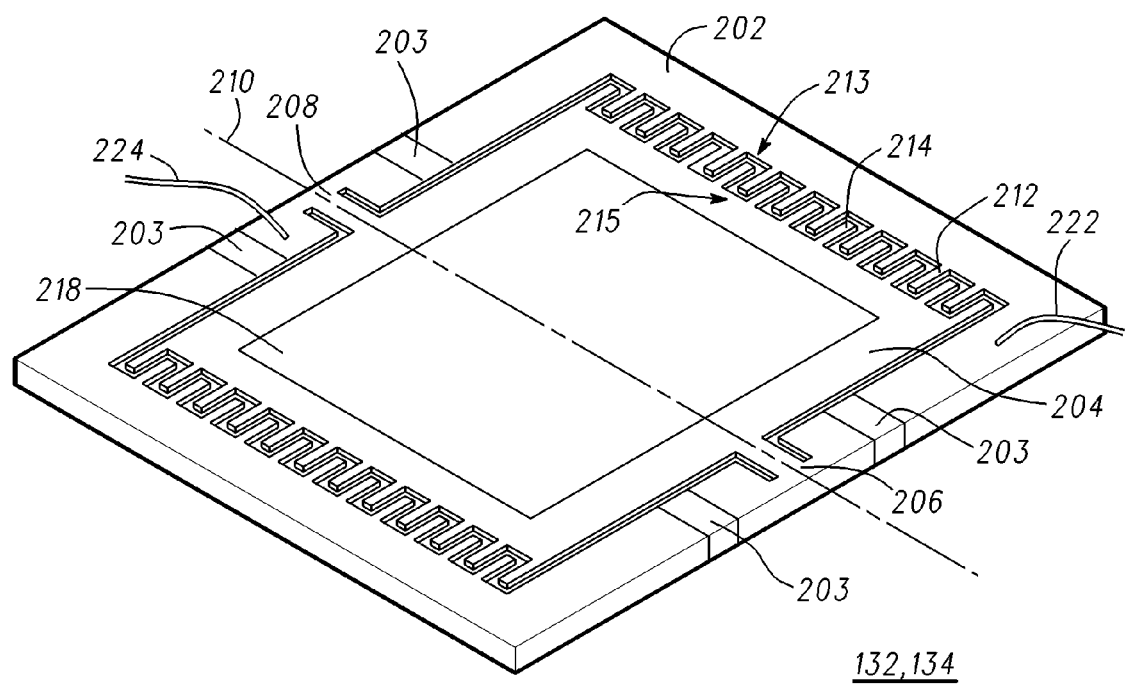
FIG. 2 is a side view of a mirror in accordance with a first exemplary embodiment.

Referring to FIG. 2 and in accordance with a first exemplary embodiment, the scan mirror 132, 134 comprises a moveable frame 202 and an oscillating portion 204. The moveable frame 202 and oscillating portion 204 are fabricated of a one-piece, generally planar, silicon substrate which is approximately 150 microns thick. The frame 202 supports the oscillating portion 204 by means of hinges that includes a pair of co-linear hinge portions 206, 208 extending along a hinge axis 210 and connecting between opposite regions of the oscillating portion 204 and opposite regions of the frame 202. The frame 202 need not surround the oscillating portion 204 as shown. The silicon is etched to form a plurality of teeth 212 defining slots 213 in the frame 202, and a plurality of teeth 214 defining slots 215 in the oscillating portion 204. The teeth 212 and 214 are shown on opposed sides of the oscillating portion 204, but may be disposed on only one side or on adjacent sides as well. The teeth 212 and 214 are electrically conductive, but are electrically isolated from the teeth 212 on the frame 202, and are interdigiated to form opposed comb structures. The electrical connections 222, 224 to the teeth 212 and 214, respectively, and the isolation therebetween, may be accomplished, for example, by doping the frame 202 in order to make the silicon frame electrically conductive, as is well known in the semiconductor industry, except for a portion 203. As an alternative to doping the silicon, a thin conductive material, such as silver or gold, for example, may be formed on the frame 202 and oscillating portion 204. When a conductive material is formed on the frame 202, the portion 203 would not be coated in order to electrically isolate the scanning mirror portion from the frame. Oscillating portion 204 includes a reflective portion 218 for reflecting the beams 103, 105, 107.

Figure 3:
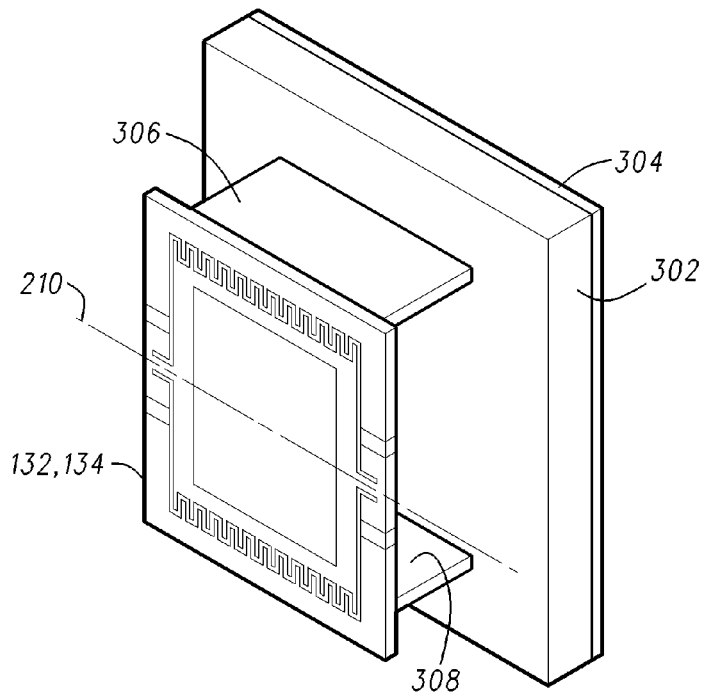
FIG. 3 is a perspective front view of an inertial drive for use with the first exemplary embodiment.

An inertial drive 302 shown in FIG. 3 is a high-speed, low electrical power-consuming device that typically is mounted on a printed circuit board 304. A scan mirror, for example, scan mirror 132 or 134, is mounted on the inertial drive 302 by piezoelectric transducers 306, 308 extending perpendicularly between the frame 202 and the inertial drive 302, and on opposed sides of the axis 210. Although only two piezoelectric transducers 306, 308 are shown, additional piezoelectric transducers, such as four, may be used. An adhesive may be used to insure a permanent contact between the one end of each transducer 306, 308 and the frame 202. Each transducer 306, 308 is coupled by connectors (not shown) to the printed circuit board 304 to receive a periodic alternating voltage. The piezoelectric transducers 306, 308 could be mounted on printed circuit boards, ceramic substrates, or any rigid substrate, as long as electrical connections can be made to thereto.

Figure 4:
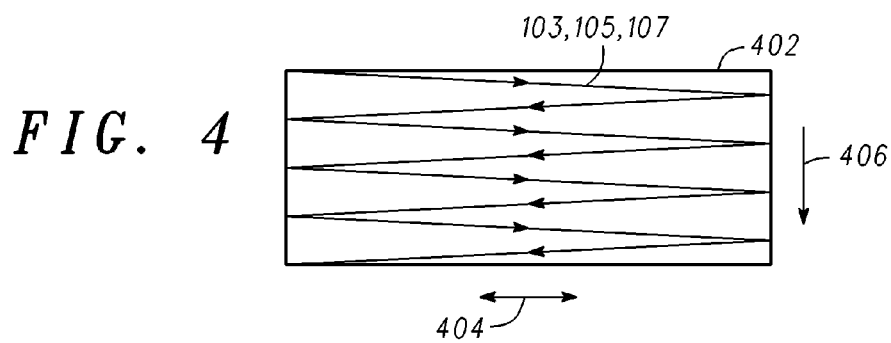
FIG. 4 is a projection of an image showing scan lines provided from the system of FIG. 1.

One of the scan mirrors, for example scan mirror 132, oscillates to provide a horizontal scan (direction 404) as illustrated on the display 402 in FIG. 4. The other of the scan mirrors, for example scan mirror 134, oscillates to provide a vertical scan (direction 406).

In operation, the periodic alternating voltage causes the respective transducer 306, 308 to alternatively extend and contract in length. When transducer 306 extends, transducer 308 contracts, and vice versa, thereby simultaneously pushing and pulling the frame 202 to twist, or move, about the axis 210. As the frame moves, the oscillating portion 204 reaches a resonant oscillation about the axis 210. As the oscillating portion 204 oscillates, the teeth 214 move back and forth with regards to the teeth 212 of the frame 202 creating a change in capacitance.

The capacitance may be measured in a manner known by those in the industry by coupling an oscillator circuit (not shown) to the connectors 222, 224. By measuring the capacitance of the oscillator, the capacitance between the teeth 212, 214 may be determined. A Colpitts oscillator is one preferred example of the oscillator circuit; however, many types of other oscillator circuits may be used.

Figure 5:
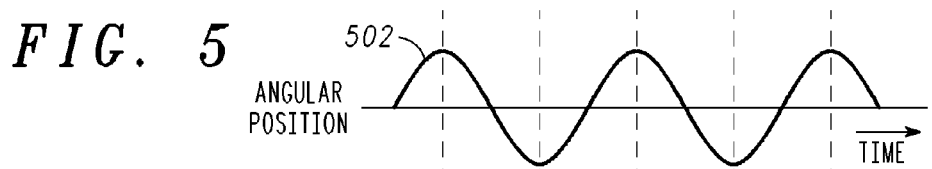
FIG. 5 is a graph showing angular position over time of a scan mirror of the exemplary embodiments.
Figure 6:
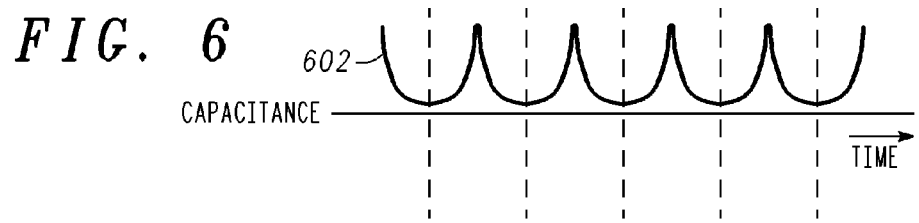
FIG. 6 is a graph showing capacitance measured with the exemplary embodiment.

FIGS. 5 and 6 are graphs, respectively, of the angular position 502 of the oscillating portion 204 measured over time, and the capacitance 602 detected between the teeth 212 of the frame 202 and the teeth 214 of the oscillating portion 204 measured over time.

The capacitance between the teeth 212 and 214 is sensed, as the reflective surface 218 oscillates, that correlates to a position of the reflective surface 218. This capacitance, or position, is then synced with the pulsed light source 102, 104, 106 by a processor to provide an improved convergence of the scanned lines of the image.

Figure 7:
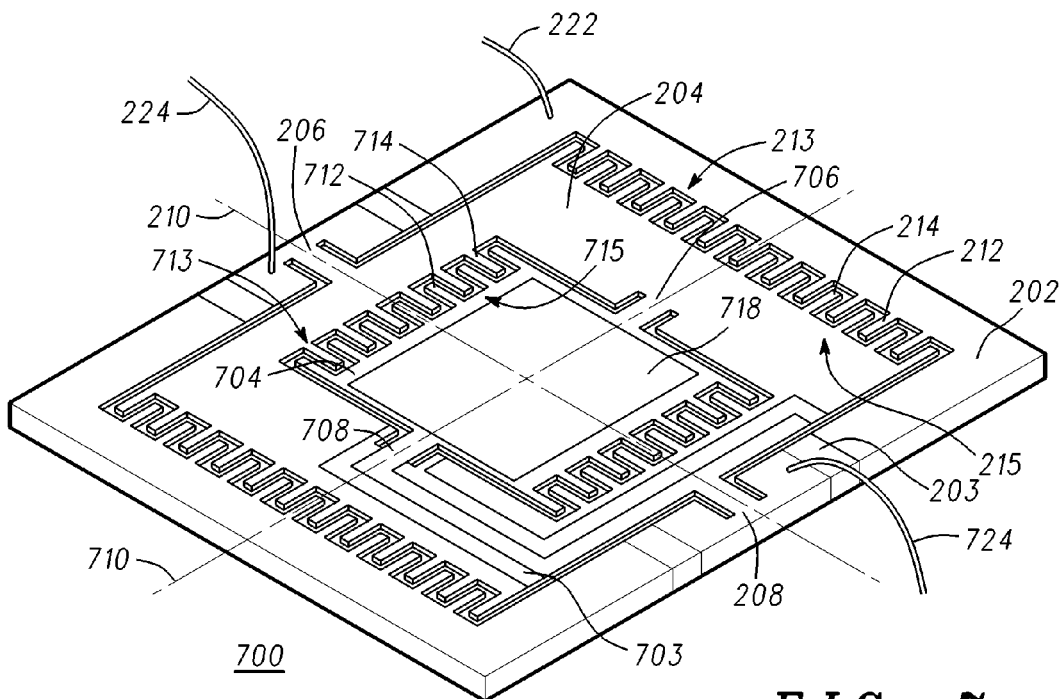
FIG. 7 is a side view of a mirror in accordance with a second exemplary embodiment.

Referring to FIG. 7 and in accordance with a second exemplary embodiment, a single scan mirror 700 may be used instead of the scan mirrors 132, 134. An outer portion of the scan mirror 700 comprises the scan mirror as illustrated in FIG. 2 and bears a similar numbering scheme.

However, the scan mirror 700 differs from that of FIG. 2 in that an oscillating portion 704 is disposed within the oscillating portion 204. Oscillating portion 704 includes a reflective portion 718 for reflecting the beams 103, 105, 107. Each of the oscillating portions 204, 704 are electrically isolated from each other and from the frame 202.

The oscillating portion 704 is fabricated of a one-piece, generally planar, silicon substrate which is approximately 150 microns thick. The oscillating portion 204 supports the oscillating portion 704 by means of hinges that includes a pair of co-linear hinge portions 706, 708 extending along a hinge axis 710 and connecting between opposite regions of the oscillating portion 704 and opposite regions of the oscillating portion 204. The oscillating portion 204 need not surround the oscillating portion 704 as shown. The silicon is etched to form a plurality of teeth 712 defining slots 713 in the oscillating portion 704, and a plurality of teeth 714 defining slots 715 in the oscillating portion 704. The teeth 712 and 714 are shown on opposed sides of the oscillating portion 704, but may be disposed on only one side or on adjacent sides as well. The teeth 712 and 714 are electrically conductive, but are electrically isolated. This isolation may be accomplished, for example, by doping the frame 202 and the oscillating portion 704 in order to make them electrically conductive, as is well known in the semiconductor industry, except for portions 203 and 703. As an alternative to doping the silicon, a thin conductive material, such as silver or gold, for example, may be formed on the frame 202 and oscillating portion 704. Oscillating portion 704 includes a reflective portion 718 for reflecting the beams 103, 105, 107. Movement of the oscillating portion 704 is accomplished by moving the frame 202 at a resonant frequency.

As explained above, an oscillator circuit (not shown) is coupled to conductors 222 and 224 to measure the capacitance between the teeth 212 and 214. Likewise, another oscillator circuit (not shown) is coupled to conductors 222 and 724 to measure the capacitance between the teeth 214 and 914. The oscillator circuit determines the capacitance between the teeth 712 and 714, as the reflective surface 718 oscillates, that correlates to a position of the reflective surface 718. This capacitance, or position, is then synced with the pulsed light source 102, 104, 106 by a processor to provide an improved convergence of the scanned lines of the image.

Figure 8:
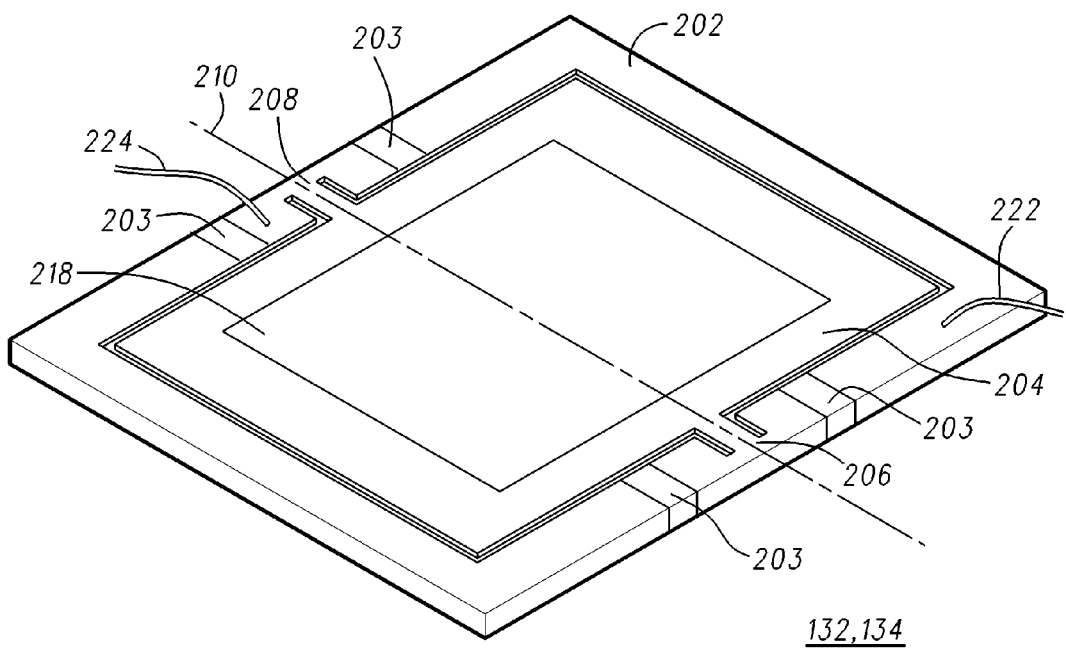
FIG. 8 is a side view of a mirror in accordance with a third exemplary embodiment.

While the exemplary embodiments described above include teeth 212, 214, 712, 714, another exemplary embodiment my exclude the teeth. FIG. 8 shows such a device 800 wherein the frame 202 and the oscillating portion 204 are adjacent one another without the teeth. While the measurable capacitance changes would be more pronounced with the exemplary embodiment of FIG. 2, the capacitive changes would be measurable for device 800. An exemplary embodiment without teeth is also envisioned for the device 700 of FIG. 7.

In other exemplary embodiments, the teeth 212, 214, and or 712, 714 may be positioned on the frame 202, 702 and the oscillating portion 204, 704 otherwise than shown above; for example, the reflective portion 218 may overlie the teeth 214.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An image projection system comprising:
a laser providing a beam;
a scan mirror comprising:
a frame; and
a first oscillating portion disposed contiguous to the frame and including a reflective portion capable of reflecting the beam; and
circuitry measuring the capacitance between the frame and the oscillating portion.

2. The image projection system of claim 1 wherein the frame comprises:
a first plurality of teeth;
and wherein the first oscillating portion comprises:
a second plurality of teeth interdigitated with the first plurality of teeth, wherein a relative movement between the first and second plurality of teeth cause a change in capacitance.

3. The image projection system of claim 1 further comprising:
a controller coupled to the laser and the circuitry for synching a pulsing of the beam with the position of the oscillating portion as determined from the capacitance.

4. The image projection system of claim 1 further comprising:
a drive apparatus attached to the frame for imparting motion thereto.

5. The image projection system of claim 1 wherein the beam comprises:
a plurality of substantially co-linear directed beams.

6. The image projection system of claim 1 wherein the circuitry comprises:
an oscillator circuit.

7. The image projection system of claim 1 wherein the first oscillating portion comprises a second oscillating portion disposed between the frame and the first oscillating portion.

8. The image projection system of claim 2 wherein the first oscillating portion comprises a second oscillating portion disposed between the frame and the first oscillating portion, the second oscillation portion comprising a third plurality of teeth, and wherein the first oscillating portion comprises a fourth plurality of teeth interdigitated with the third plurality of teeth.

9. An image projection system comprising:
a light source providing a pulsed laser beam;
a mirror comprising:
a drive apparatus;
a frame moveable in response to the drive apparatus; and
a first reflective portion disposed contiguous to the frame for receiving the laser beam, and oscillating in response to the movement of the frame to provide an image;
measuring circuitry determining the capacitance between the frame and the first reflective portion; and
control circuitry synchronizing the pulsed laser beam with the position of the mirror based on the measured capacitance.

10. The image projection system of claim 9 wherein the frame comprises:
a first plurality of teeth; and
and wherein the oscillating portion comprises:
a second plurality of teeth interdigitated with the first plurality of teeth, wherein a relative movement between the first and second plurality of teeth cause a change in capacitance.

11. The image projection system of claim 9 wherein the beam comprises:
a plurality of substantially co-linear directed beams.

12. The image projection system of claim 9 wherein the measuring circuitry comprises:
an oscillator circuit.

13. The image projection system of claim 9 wherein the first oscillating portion comprises a second oscillating portion disposed between the frame and the first oscillating portion.

14. The image projection system of claim 10 wherein the first oscillating portion comprises a second oscillation portion disposed between the frame and the first oscillating portion, the second oscillation portion comprising a third plurality of teeth, and wherein the first oscillating portion comprises a fourth plurality of teeth interdigitated with the third plurality of teeth.

15. An image projection system comprising:
a light source providing at least one laser beam;
a scanner for sweeping the at least one laser beam along mutually orthogonal scan directions to project a pattern of scan lines, the scanner comprising:
a drive apparatus; and
at least one mirror from which the laser beam is reflected, the drive apparatus causing the at least one mirror to oscillate, thereby causing the sweeping of the laser beam; and
a processor providing a signal to the drive apparatus;

wherein the mirror comprises:
- a frame attached to the drive apparatus and including a first plurality of spaced apart teeth; and
- a first reflective portion attached to the frame, the reflective portion including a second plurality of spaced apart teeth interdigitized with the first plurality of teeth; and circuitry coupled to the frame and the first reflective portion for measuring a capacitance relative to the positioning of the first and second teeth, the processor syncing the at least one laser beam with the positioning of the at least one mirror based on the measured capacitance.

16. The image projection system of claim 15 wherein the circuitry comprises an oscillator circuit for measuring the capacitance.

17. The image projection system of claim 15 wherein the mirror further comprises a second reflective portion attached between the frame and the first reflective portion and including a third plurality of spaced apart teeth, and wherein the first reflective portion includes a fourth plurality of spaced apart teeth interdigitized with the third plurality of teeth.

* * * * *